United States Patent Office 3,743,630
Patented July 3, 1973

3,743,630
STYRENE POLYMERIZATION WITH RING SUBSTITUTED ALKYL PERBENZOATES AND NEW BRANCHED CHAIN ALKYL PERBENZOATES
Donald W. Wood, Concord, Calif., assignor to Argus Chemical Corporation, Brooklyn, N.Y.
No Drawing. Continuation-in-part of application Ser. No. 107,535, Jan. 18, 1971, which is a continuation-in-part of application Ser. No. 814,449, Apr. 8, 1969, both now abandoned. This application June 30, 1971, Ser. No. 158,583
Int. Cl. C08f 1/60, 7/04
U.S. Cl. 260—93.5 W          33 Claims

ABSTRACT OF THE DISCLOSURE

Use of ring substituted alkyl perbenzoates alone or in combination with benzoyl peroxide for polymerization of styrene monomer to polystyrene. New branched chain t-alkyl perbenzoates have the same utility. Typical is use of t-butyl per o-methoxy benzoate and 1,1,3,3-tetramethylbutyl perbenzoate.

---

This is a continuation-in-part of copending patent application Ser. No. 107,535, filed Jan. 18, 1971, now abandoned, which in turn is a continuation-in-part of patent application Ser. No. 814,449, filed Apr. 8, 1969, which is also now abandoned.

This invention relates to the production of polystyrene from styrene monomer. More particularly, the invention relates to the use of ring substituted alkyl mono and diester perbenzoates as free radical polymerization initiators of styrene monomer and to new branched chain t-alkyl perbenzoates which may also be used for the same purpose.

Progress has previously been reported concerning the reduction of residual monomer content in polystyrene polymers. The presence of styrene monomer in the end product polymer has been held responsible for the creation of high shrinkage of the polymer in boiling water, low resistance to heat distortion, potential discoloration from oxidation of the monomer, and crazing due to escape of volatile or fugitive materials.

In order to reduce the residual monomer content in polystyrene it has been suggested to employ a combination initiator or catalyst such as benzoyl peroxide and t-butyl perbenzoate. Adjustment of the rate of addition of the catalyst and reaction temperatures has been further suggested as a means for decreasing the total polymerization reaction times.

The present invention improves upon these earlier efforts and provides an initiator composition for the polymerization of styrene monomer to form polystyrene at an increased rate as compared with the rates of conversion of the monomer with previously used catalysts. In most instances the monomer content of the polystyrene end product is lower than that previously achieved. This is consistently true where the reaction is terminated within a reasonable period of time. While monomer content might be reduced by carrying on the reaction indefinitely, the present process has the practical commercial advantage of achieving a very low molecular residue within a few hours.

In accordance with the present invention styrene monomer is polymerized with an effective amount of an organic peroxide initiator of the formula:

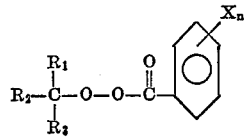

In the above formula $R_1$, $R_2$ and $R_3$ are the same or different straight or branched chain alkyl usually having up to about 10 carbon atoms, preferably of 1–5 carbon atoms. Alternatively, $R_1$ and $R_2$ are straight or branched chain alkyl and $R_3$ is the group

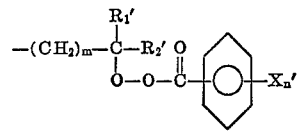

where $m$ is an integer from 1 to 5 and $R_1'$ and $R_2'$ are straight or branched chain alkyl, preferably where $R_1$, $R_2$, $R_1'$ and $R_2'$ have 1–5 carbon atoms.

$n$ is an integer from 1 to 3 and most usually either 1 or 2, except that when at least one of $R_1$, $R_2$, and $R_3$ is branched chain alkyl $n$ can be 0, i.e. the benzene ring can be free from substituents. X and X' are the same or different alkyl, halogen, or alkoxy. Preferably, the halogen selected is chlorine although the other halogens bromine, fluorine, and iodine may be selected. The alkyl groups may be either straight or branched chain and preferably will be lower alkyl, i.e. having up to about 5 carbon atoms. The alkoxy substituents may be similarly selected from straight or branched chain groups and also are preferably lower alkoxy having up to about 5 carbon atoms. As will be shown hereinafter, each of the ortho, meta or para position isomers provide the advantages of this invention. It is contemplated that any one isomer may be employed alone in the process. Frequently a mixture of several isomers will be employed for practical purposes to avoid a separation step after their synthesis. While all of the isomers provide the advantages of this invention, it has been found that when X (and X'), in the above formula, is in the ortho position on the ring, unexpectedly superior results are obtained and therefore such compounds are preferably used in the process.

Examples of ring substituted perbenzoates and branched t-alkyl perbenzoates suitable for use are the following:

t-amyl per-2,4-dibromo benzoate
t-hexyl per p-ethoxy benzoate
t-octyl per m-methyl benzoate
3,6-dimethyloctane-3,6-diper o-ethyl benzoate
2,7-dimethyloctane-2,7-diper o-chloro benzoate
2,9-dimethyldecane-2,9-diper p-isobutoxy benzoate
1,1,3,3-tetramethylbutyl perbenzoate
1,1,3,3-tetramethylbutyl per-o-toluate
1,1,3,3-tetramethylbutyl per-o-ethoxybenzoate The alkyl perbenzoates of this invention perform in a superior manner with respect to reaction rate and reduction of monomer content when used as the sole styrene initiator as compared with the various organic peroxides that have heretofore been used. In a preferred embodiment a ring substituted alkyl perbenzoate of this invention is used in combination with benzoyl peroxide and even better results in terms of reaction rate and elimination of monomer residue are obtained. The use of a dual catalyst is described in U.S. Pat. No. 2,656,334, issued to Gaetano F. D'Alelio. The use of the composite catalyst or initiator of this invention improves upon the results obtained with the initiator combinations described in the prior art.

The present process is generally consistent with prior procedures except for the use of the specified types of ring substituted alkyl perbenzoates and branched chain t-alkyl perbenzoates. Thus it is preferable to conduct the polymerization reaction in an aqueous suspension media of the type previously used. The initiator can be added all at once at the beginning of the reaction or an incremental addition technique such as described in U.S. Pat. No.

2,907,756 can be employed. Either way the same advantages are shown for the present process. The reaction temperatures are consistent with those common in the polystyrene industry with a preferred range for the polymerization reaction being about 100–120° C.

The initiator of this invention, either the t-alkyl perbenzoate alone or in combination with benzoyl peroxide, is preferably added so as to constitute about .05–1% by weight of the monomer being polymerized and most preferably to constitute about .1–.3% by weight of the monomer. Where a combined catalyst is used, the weight ratio of benzoyl peroxide to t-alkyl perbenzoate is preferably about one part of benzoyl peroxide to about .5–3 parts by weight of the perester with best results having been obtained so far where the perester is about 1–2 parts by weight for each part by weight of benzoyl peroxide.

The following experimental work will illustrate the advantages of the new process:

EXAMPLE I

The following procedure was used to obtain the data in all of the subsequent examples. The variation in each of the subsequent examples relates only to the use of different organic peroxide initiators and amounts employed as will be indicated.

In a 6½ fl. oz. Coke bottle was placed 50 g. of an aqueous mixture containing 0.004 g. Dow 2A1 (di-sodium 4-dodecylated oxydibenzene sulfonate anionic surfactant), 0.0255 g. anhydrous $Na_2CO_3$, and 0.396 g. $Na_3PO_4 \cdot 12H_2O$. To this mixture was added with swirling 1 cc. of an aqueous mixture containing 0.2856 g. $CaCl_2 \cdot 2H_2O$. To the resulting suspension mixture was added 25 g. styrene/initiator, the bottle flushed with $N_2$ and capped. The bottles were placed in 100° C.±0.5 bath and rotated end over end for the required length of time. After cooling, the bottles were opened and 2 cc. con. HCl added. The product was filtered, washed, and dried 2 hours at 70° C. on a paper towel.

The product was analyzed for residual monomer by gas-liquid chromatography.

EXAMPLE II

.1% by weight of benzoyl peroxide was mixed with a series of tertiary butyl peresters as listed in the chart below. Each perester was added in an amount equivalent, on the basis of active oxygen content, to .1% by weight of benzoyl peroxide. The "mixed toluates" shown represent a mixture of ortho, meta, and para isomers. Also shown for comparison is the effectiveness of .2% by weight of benzoyl peroxide.

The catalysts listed were all used in the procedure of Example I and the percent residual styrene monomer at various time periods from the commencement of the reaction was determined. From the results it will be seen that the combination of this invention, viz. benzoyl peroxide and tertiary butyl toluates, more rapidly reduces the styrene monomer residue. It is further to be noted that the monomer residue falls below .1% by weight within 15 hours from the start of the reaction. A monomer residue of not more than .1% by weight has previously been considered by the art to be "substantially monomer free."

| | Percent monomer | | | |
|---|---|---|---|---|
| Hours since start of reaction | 10 | 15 | 20 | 25 |
| t-Butyl perester: | | | | |
| n-Octanoate | 2.07 | 0.31 | 0.20 | 0.09 |
| Mixed toluates | 0.39 | 0.05 | 0.014 | 0.0097 |
| Crotonate | 7.26 | 0.22 | 0.075 | 0.062 |
| Benzoate | 4.88 | 0.16 | 0.036 | 0.031 |
| Benzoyl peroxide (0.2%) | 5.7 | 4.9 | 4.3 | 3.8 |

EXAMPLE III

In this example the procedure of Example I was again followed but with individual organic peroxide initiators and not as a combination catalyst. The t-butyl peresters listed were added to provide an active oxygen content equivalent to that of .1% of benzoyl peroxide. Benzoyl peroxide is again shown for comparison at the .1% by weight level. Here again the superiority of the t-butyl pertoluates is demonstrated. A "substantially monomer free" polystyrene end product is obtained within 16 hours from the start of the reaction.

| | Percent monomer | | | |
|---|---|---|---|---|
| Hours since start of reaction | 11 | 15 | 20 | 25 |
| t-Butyl perester: | | | | |
| n-Octanoate | 30.8 | 4.2 | 0.91 | 0.98 |
| Mixed toluates | 7.5 | 0.16 | 0.003 | <0.001 |
| Crotonate | 7.1 | 2.3 | 0.17 | <0.001 |
| Benzoate | 24.6 | 2.2 | 0.055 | <0.001 |
| Benzoyl peroxide (.1%) | 27.3 | 18.4 | 12.3 | 9.4 |

EXAMPLE IV

This example illustrates the effectiveness of each of the isomers of t-butyl pertoluate. The procedure of Example I was again followed with the initiators being added to provide an active oxygen content equal to that of .2% by weight of benzoyl peroxide.

| | Percent monomer | | | |
|---|---|---|---|---|
| Hours since start of reaction | 10 | 14 | 18 | 22 |
| t-Butyl perester: | | | | |
| Benzoate | 4.4 | 0.064 | <0.001 | <0.001 |
| o-Toluate | 0.39 | <0.001 | <0.001 | <0.001 |
| m-Toluate | 2.0 | 0.043 | <0.001 | <0.001 |
| p-Toluate | 1.1 | <0.001 | <0.001 | <0.001 |

EXAMPLE V

This example further illustrates the more rapid conversion of monomer to polystyrene obtainable by the present process in different terms of measurement. The results report the reaction time needed to reach a 1% by weight styrene monomer residue in polystyrene product. The initiators were used in an amount providing an active oxygen content equal to that of .1% by weight of benzoyl peroxide.

| | Time to reach 1% monome residue at 100° C. (hrs.) |
|---|---|
| t-Butyl peresters: | |
| Perbenzoate | 16.1 |
| Pertoluate (mixed isomers) | 13.2 |
| Percrotonate | 15.9 |
| p-Chloro benzoate | 12.0 |
| Diisopropyl benzoate (mixed isomers) | 11.0 |
| p-t-Butyl benzoate | 10.5 |
| o-Chloro benzoate | 10.0 |
| Ethyl benzoate (mixed isomers) | 9.8 |
| Diethyl benzoate (mixed isomers) | 9.2 |
| p-Methoxy benzoate | 9.0 |
| o-Methyl benzoate (o-toluate) | 8.2 |
| o-Ethoxy benzoate | 7.3 |
| o-Methoxy benzoate | 7.3 |
| Diperesters: | |
| 2,5-dimethylhexane-2,5-diperbenzoate | 11.4 |
| 2,5-dimethylhexane-2,5-diper o-methyl benzoate | 6.8 |

The new compounds provided by this invention and which are particularly suited for styrene polymerization with elimination of monomer residue are represented by the formula:

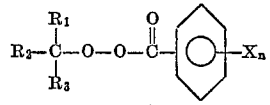

where $R_1$, $R_2$, and $R_3$ are alkyl of up to about 10 carbon atoms, preferably up to about 5 cabron atoms, provided at least one of $R_1$, $R_2$, and $R_3$ is branched chain alkyl; X is selected from lower alkyl, halogen, and lower alkoxy; and $n$ is an integer from 0 to 3.

In the preferred embodiment, two of the R's are straight chain lower alkyl such as methyl or ethyl, and the remaining R is branched. Particularly desired compounds are obtained where $R_1$, $R_2$, and $_3$ together with their associated tertiary carbon atom form the 1,1,3,3-tetramethylbutyl group.

The new compounds may be made by esterifying a corresponding hydroperoxide with the corresponding acid halide. The following examples illustrate their synthesis.

EXAMPLE VI

Preparation of 1,1,3,3-tetramethyl butyl per o-toluate

In a suitable glass vessel, fitted with agitator, thermometer and means for cooling the contents were charged 25 ml. water and 21.88 g. (0.195 m.) KOH–50%. The reaction was cooled to +10° C. and 26.75 g. (0.150 m.) of 1,1,3,3 - tetramethylbutyl hydroperoxide (82% pure) was added with stirring and maintaining the temperature at +10° to +15° C. Over a period of 15 minutes, 23.19 g. (0.150 m.) of o-toluoyl chloride was added dropwise. The reaction mixture was stirred for another 90 minutes, during which time the temperature was maintained at +15° to +17° C. The agitation was stopped and allowed to phase separate. The aqueous layer was discarded and the organic phase was washed with an equal volume of tap water, with an equal volume of 5% NaOH, and equal volume of tap water. The product was dried over anhydrous magnesium sulfate and a 91.31% yield was obtained.

Active oxygen analysis—Found: 5.96. Theory: 6.05.

IR scans and GLC analysis indicated the absence of undesired impurities.

EXAMPLE VII

Preparation of 1,1,3,3-tetramethyl butyl per o-ethoxy benzoate (alternate process)

In a suitable glass vessel, fitted with agitator, thermometer and means for cooling were charged 23.73 g. (0.30 m.) of pyridine and 19.67 g. (0.100 m.) of 1,1,3,3-tetramethyl butyl hydroperoxide (74.35% pure). The reactants were agitated and temperature maintained below +10° C. during charge. Next, with stirring and cooling, 20.31 g. (0.110 m.) of o-ethoxy benzoyl cholride were added dropwise over a period of 45 minutes. The reaction warmed to +35° C. and was continued for 95 minutes. Upon completion of the reaction, an equal volume of ice water was charged and the agitation stopped. The reactants were phase separated and the aqueous layer discarded. The organic layer was washed with tap water, 5% NaOH, tap water and a 5% solution of NaCl. The product was dried over anhydrous magnesium sulfate and a 91.88% yield was obtained.

Active oxygen analysis—Found: 4.59. Theory: 5.43.

IR scans and GLC analysis confirmed the desired structure.

In a similar manner, 1,1,3,3-tetramethyl butyl perbenzoate was prepared in 94.71% yield from the same hydroperoxide and benzoyl chloride.

EXAMPLE VIII

This example illustrates the unexpectedly superior performance of 1,1,3,3 - tetramethylbutyl perbenzoates and ring substituted derivatives thereof. For comparison, polymerization with t-butyl perbenzoate has been included. The results below were obtained from derivatives of 1,1,3,3-tetramethylbutyl hydroperoxide. These results are typical of the generic class of new compounds of this invention in which at least one of the alkyl groups on the tertiary carbon atom of the hydroperoxide has a branched chain.

The results below were obtained by the same procedure employed in Example V and are reported in the same manner except that the peresters of the table below were employed with the styrene monomer in an amount which provided an active oxygen content equal to that of .2% by weight of benzoyl peroxide.

| Peresters: | Time to reach 1% monomer residue at 100° C. (hrs.) |
|---|---|
| 1. t-Butyl perbenzoate | 16.1 |
| 2. 1,1,3,3-tetramethylbutyl perbenzoate | 8.3 |
| 3. 1,1,3,3-tetramethylbutyl per-o-toluate | 7.1 |
| 4. 1,1,3,3-tetramethylbutyl per-o-ethoxybenzoate | 5.9 |

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In the process for making polystyrene of reduced residual monomer content by polymerizing styrene monomers in an aqueous suspension media under styrene monomer polymerization conditions in the presence of an effective amount of an organic peroxide polymerization initiator, the improvement in which said organic peroxide initiator comprises a perester of the formula:

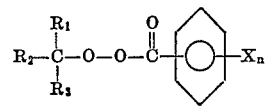

wherein $R_1$ and $R_2$ are individually selected from straight and branched chain alkyl having up to 10 carbon atoms, $R_3$ is the group

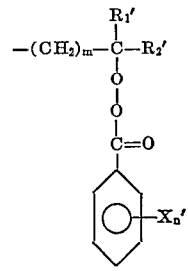

wherein $R_1'$ and $R_2'$ are straight or branched chain alkyl having 1–5 carbon atoms, $m$ is an integer from 1 to 5, $n$ is an integer from 1 to 3 and each X and X' is individually selected from lower alkyl having up to 5 carbon atoms, halogen, and lower alkoxy having up to 5 carbon atoms.

2. The process in accordance with claim 1 wherein $n$ is 1 and X is in the ortho position.

3. The process in accordance with claim 2 wherein X is lower alkyl.

4. The process in accordance with claim 3 wherein $n$ is 1 and X is methyl.

5. The process in accordance with claim 3 wherein $n$ is 1 and X is ethyl.

6. The process in accordance with claim 3 wherein $n$ is 2 and X is ethyl.

7. The process in accordance with claim 3 wherein $n$ is 2 and X is isopropyl.

8. The process in accordance with claim 3 wherein $n$ is 1 and X is t-butyl.

9. The process in accordance with claim 1 wherein X is lower alkoxy.

10. The process in accordance with claim 9 wherein $n$ is 1 and X is methoxy.

11. The process in accordance with claim 9 wherein $n$ is 1 and X is ethoxy.

12. The process in accordance with claim 4 wherein said methyl group is in the ortho position.

13. The process in accordance with claim 10 wherein said methoxy group is in the ortho position.

14. The process in accordance with claim 11 wherein said ethoxy group is in the ortho position.

15. The process in accordance with claim 1 wherein $n$ is 1 and X is chlorine.

16. The process in accordance with claim 15 wherein said chlorine is in the ortho position.

17. The improved process in accordance with claim 1 wherein said organic peroxide initiator contains benzoyl peroxide in combination with said perester.

18. The improved process in accordance with claim 17 wherein the weight ratio of benzoyl peroxide to perester is about 1 to .5–3.

19. The process in accordance with claim 1 wherein $R_1$ and $R_2$ are straight chain lower alkyl having 1–5 carbon atoms.

20. The process in accordance with claim 19 wherein $R_1$, $R_2$, $R_1'$, and $R_2'$ are methyl and $m=2$.

21. The process in accordance with claim 20 wherein $n=1$ and X and X' are in the ortho positions.

22. The process in accordance with claim 21 wherein X and X' are methyl.

23. The improved process in accordance with claim 1 wherein $R_1$ and $R_3$ are methyl and $R_2$ is 2,2-dimethyl propyl.

24. The improved process in accordance with claim 23 wherein $n$ is 0.

25. The improved process in accordance with claim 23 wherein $n$ is 1 and X is methyl.

26. The improved process in accordance with claim 25 wherein said methyl group is in the ortho position.

27. The improved process in accordance with claim 23 wherein $n$ is 1 and X is ethoxy.

28. The improved process in accordance with claim 27 wherein said ethoxy group is in the ortho position.

29. The improved process in accordance with claim 1 wherein $R_1$, $R_2$, and $R_3$ each have up to about 5 carbon atoms.

30. An improved process in accordance with claim 1 wherein said perester constitutes about .05–1% by weight of styrene monomer.

31. An improved process in accordance with claim 1 wherein the polymerization of the styrene monomer is executed at a constant temperature of about 100–120° C.

32. An improved process in accordance with claim 1 wherein said perester comprises a mixture of isomers.

33. An improved process in accordance with claim 1 wherein the initiation of said polymerization is executed with benzoyl peroxide in combination with said perester in a weight ratio of 1 part of benzoyl peroxide to about 1–2 parts of the perester, and the combination of peroxides comprises about .1–.3% by weight of the styrene monomer.

References Cited
UNITED STATES PATENTS

| | | | |
|---|---|---|---|
| 2,656,334 | 10/1953 | D'Alelio | 260—47 |
| 2,907,756 | 10/1959 | Doak | 260—93.5 |
| 3,370,022 | 2/1968 | Ingram et al. | 260—2.5 |
| 3,384,682 | 5/1968 | Erchak et al. | 260—874 |
| 3,445,404 | 5/1969 | Ronden et al. | 260—2.5 |

JAMES A. SEIDLECK, Primary Examiner

S. M. LEVIN, Assistant Examiner

U.S. Cl. X.R.

260—610 D